United States Patent [19]
Scherer

[11] Patent Number: 5,846,087
[45] Date of Patent: Dec. 8, 1998

[54] ANATOMICAL SIMULATOR AND METHOD FOR TRACHEOSTOMY TUBE PLACEMENT

[75] Inventor: Andrew J. Scherer, San Dimas, Calif.

[73] Assignee: Passy-Muir, Inc., Irvine, Calif.

[21] Appl. No.: 939,314

[22] Filed: Sep. 29, 1997

Related U.S. Application Data

[63] Continuation of Ser. No. 738,056, Oct. 25, 1996, abandoned.

[51] Int. Cl.⁶ ................................................. G09B 23/28
[52] U.S. Cl. ......................................... 434/270; 434/267
[58] Field of Search ................................. 434/270, 267, 434/262, 265, 272

[56] References Cited

U.S. PATENT DOCUMENTS

| | | | |
|---|---|---|---|
| 3,009,266 | 11/1961 | Brook | 434/265 |
| 3,376,659 | 4/1968 | Asin et al. | 434/272 |
| 3,410,003 | 11/1968 | Sovijarvi et al. | |
| 3,802,096 | 4/1974 | Matern. | |
| 4,209,919 | 7/1980 | Kirikae et al. | |
| 4,484,896 | 11/1984 | Kohnke | 434/265 |
| 4,773,865 | 9/1988 | Baldwin. | |
| 5,055,052 | 10/1991 | Johnsen. | |
| 5,090,910 | 2/1992 | Narlo. | |
| 5,195,896 | 3/1993 | Sweeney et al. | |
| 5,238,409 | 8/1993 | Brault et al. | |
| 5,312,259 | 5/1994 | Flynn. | |
| 5,314,339 | 5/1994 | Aponte. | |

FOREIGN PATENT DOCUMENTS

| | | |
|---|---|---|
| 116707 | 10/1929 | Austria. |
| 2004015 | 11/1993 | Russian Federation ............... 434/272 |
| 1121700 | 3/1983 | U.S.S.R. . |

OTHER PUBLICATIONS

Kilgore International, Inc., 1994 Catalog p. 8.
The Anatomical Products Catalog, 1995 p. 60.
The Anatomical Products Catalog, 1992 pp. 72, 107, 110.
Nasco Heath Care Educational Materials, 1994–1995 Catalog pp. 13, 45, 47 (No Date).
Nasco Heath Care Educational Materials, Catalog pp. 20, 58 (No Date).
Ambu Medical Equipment and Training Catalog, p. 39 (No Date).

*Primary Examiner*—Jeffrey A. Smith
*Attorney, Agent, or Firm*—Knobbe, Martens, Olson&Bear, LLP

[57] ABSTRACT

An anatomical simulator useful in training proper tracheostomy and nasogastric tube placement and tracheostomy tube cuff inflation is disclosed. The simulator includes a simulated trachea and simulated esophagus separated by a simulated tracheoesophageal wall. The simulated wall is flexible, such that when a tracheostomy tube is positioned therein and a cuff thereon is overinflated, the wall extends outwardly in the direction of the simulated esophagus.

16 Claims, 2 Drawing Sheets

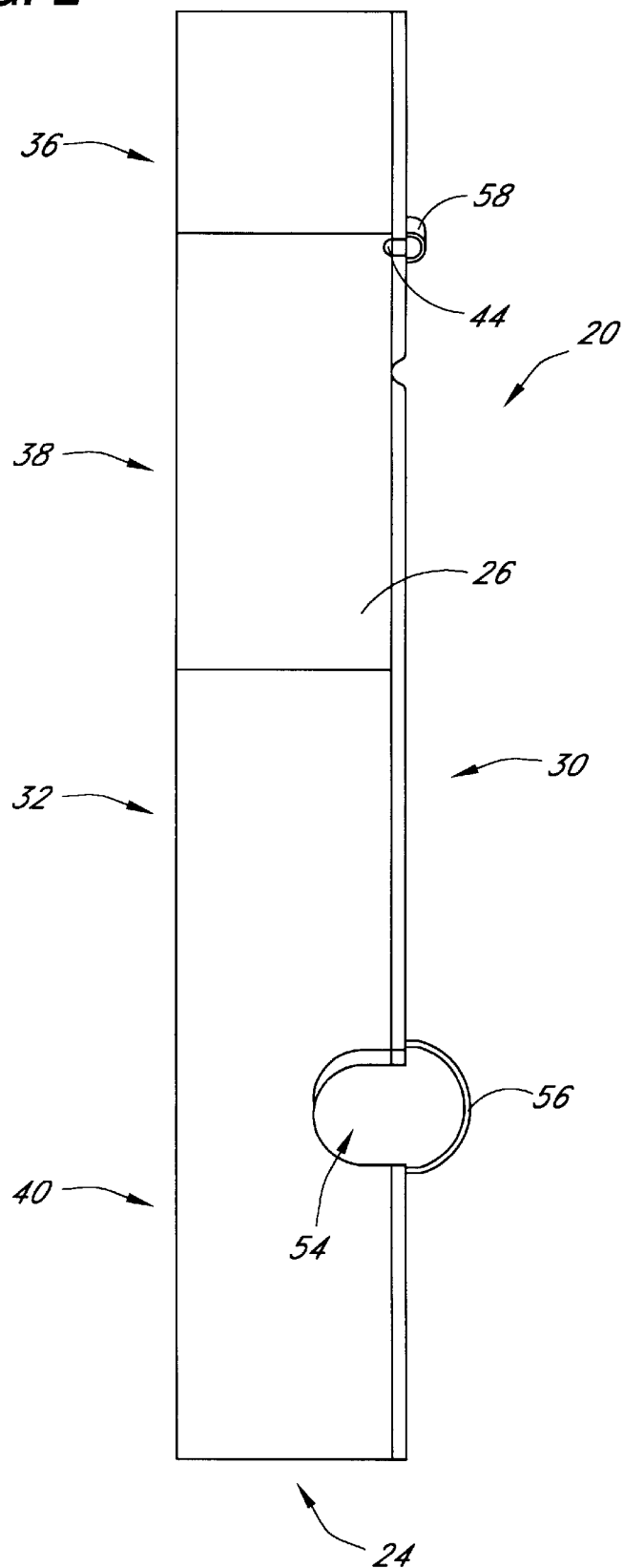

ANATOMICAL SIMULATOR AND METHOD FOR TRACHEOSTOMY TUBE PLACEMENT

This application is a continuation of U.S. patent application Ser. No. 08/738,056, filed Oct. 25, 1996, (now abandoned).

FIELD OF THE INVENTION

The present invention relates to an anatomical simulator and, more particularly, to one which is useful in training proper tracheostomy and nasogastric tube placement and proper tracheostomy tube cuff inflation.

BACKGROUND OF THE INVENTION

In some instances it is necessary to provide an alternate breathing passage other than the mouth or nose for a person. This alternate breathing passage may comprise a passage through the neck of the person in communication with the trachea. This passage or "stoma" provides an air pathway from the outside of the person's neck to the trachea and the lungs therebeyond.

A tracheostomy tube may be utilized to maintain the stoma in an open position. This tube is a curved conduit having a first open end and a second open end. The first open end is inserted through the stoma and extends into the trachea. The second open end extends outwardly of the patient's neck. The tube is maintained in position in the stoma with a strap which passes around the patient's neck.

During much of the time the tracheostomy tube is in place, it is desirable to prevent air from passing between the first end of the tube and the trachea. For example, if air can pass from the patient's mouth or nose through the trachea alongside the first end of the tube, a substantial portion of the patient's breathing effort does not result in air being drawn through the tube. On the other hand, when the patient needs to talk, air must be allowed to pass upwardly through the trachea around the outside of the first end of the tube past the vocal cords.

An inflatable cuff is typically provided on the first end of the tracheostomy tube for this purpose. The cuff encircles the first end of the tube. The cuff is in communication with an air line extending from the cuff to the second end of the tube. A syringe or the like is coupled to the line at the second end of the tube for drawing air from the cuff to deflate it, or to admit air into the cuff to inflate it. When inflated, the cuff effectively seals the space between the trachea and the first end of the tube.

One problem arising in using these cuffs is that detrimental effects can result if the cuff is overinflated. In particular, the portion of the trachea in which the first end of the tube is positioned is separated from the esophagus therebehind by the tracheoesophageal wall. This wall is flexible. If the cuff is overinflated, it presses the tracheoesophageal wall outwardly and collapses or partially collapses the esophagus.

Significant practice is necessary in order to ensure that the cuff is inflated sufficiently to seal the trachea, and yet not be overinflated. Practicing upon individual patients risks harming the patient. Presently, however, no other means exists for satisfactorily teaching proper tracheostomy and nasogastric tube placement and proper tracheostomy tube cuff inflation. It is, therefore, an object of the present invention to provide an anatomical simulator which is useful in teaching proper tracheostomy tube placement and cuff inflation.

SUMMARY OF THE INVENTION

In accordance with the present invention there is provided an anatomical simulator useful in teaching proper tracheostomy and nasogastric tube placement. In addition, the simulator is useful in teaching proper tracheostomy tube cuff inflation.

The simulator includes a simulated esophagus, simulated trachea, and simulated tracheoesophageal wall. The wall is flexible, whereby overinflation of the cuff of a tracheostomy tube positioned in the simulated trachea has the effect of pressing the wall outwardly in the direction of the esophagus.

In the preferred embodiment, the simulator has a front surface which represents the structure of the human body at a location of a cross-sectional plane taken therethrough, where the cross-sectional plane extends through the trachea, esophagus and nasal cavity. The simulator includes at least one side or second surface which simulates the exterior of the body at the location where the cross-section is taken.

In the preferred embodiment, the simulated trachea and esophagus comprise respective recessed areas formed in the front surface of the simulator. The simulator also includes simulated stoma and nasal cavity structures. The nasal cavity also comprises a recessed area in the front surface, the nasal cavity in communication with the simulated esophagus for teaching nasogastric tube placement The stoma preferably comprises a recessed area extending from the surface representing the exterior of the body to the simulated trachea.

In the preferred embodiment, means are provided for maintaining tracheostomy and nasogastric tubes in the recesses defining the represented structures.

Further objects, features, and advantages of the present invention over the prior art will become apparent from the detailed description of the drawings which follows, when considered with the attached figures.

DESCRIPTION OF THE DRAWINGS

FIG. 2 is a side view illustrating a first side of the anatomical simulator illustrated in FIG. 1.

DETAILED DESCRIPTION OF THE PREFERRED EMBODIMENT

Figure 1:
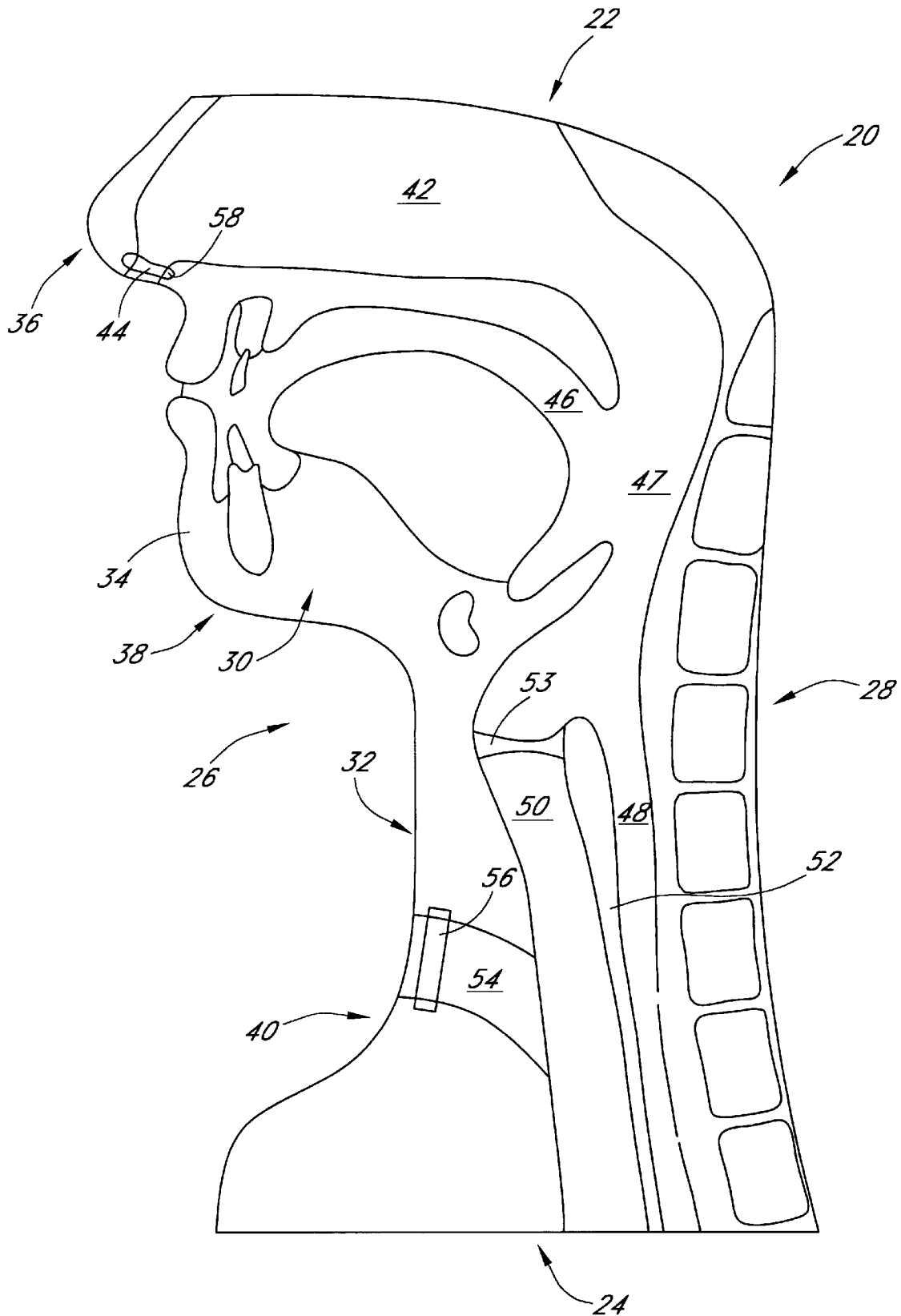
FIG. 1 is a plan view illustrating a front surface of an anatomical simulator in accordance with the present invention.

FIG. 1 illustrates an anatomical simulator 20 in accordance with the present invention. In general, the simulator 20 serves as a model of certain internal and external structures of the human body. Preferably, the simulator 20 reproduces the nasal cavity, esophagus, upper trachea and tracheoesophageal wall of the human body.

The simulator 20 has a top end 22, bottom end 24, first side 26, second side 28, a front surface 30 and a rear surface 32. The top end 22, bottom end 24, first side 26 and second side 28 define a perimeter 34 of the front surface 30.

The simulator 20 is preferably constructed of a durable, and yet somewhat flexible, material. Most preferably, the simulator 20 is constructed from polyurethane. The simulator 20 is about one inch thick (from the front to the rear surface 30,32) when formed from this type of material.

The bottom end 24 of the simulator 20 is preferably flat. The bottom end 24 of the simulator 20 provides a base upon which the simulator 20 may be positioned in an upright position, as illustrated in FIG. 1. Optionally, the bottom end 24 of the simulator 20 may be connected to a base member (not shown) for providing additional support to the simulator 20 in order to maintain it in its upright position.

The front surface 30 is preferably generally planar. This front surface 30 simulates a surface of a portion of the human body. More particularly, the front surface 30 represents the structure of the human body existing along a vertical cross-sectional plane extending through the body from front to rear and generally centered from side to side along the spine. Preferably, the portion of the human body represented by the simulator 20 includes that portion of the body from the nasal cavity at the top to the trachea and esophagus at the bottom, and from the exterior of the neck in the front, to the spinal cord in the back.

The perimeter 34 of the front surface 30 has the shape of the human body corresponding to that portion of the body of the simulated cross-section. As such, the first side 26 has the contour of the front of a human from the nose to the upper portion of the chest. The front side 26 has an outwardly extending portion 36 representing the nose, an inwardly extending section 38 representing the chin, and a downwardly extending section 40 representing the neck and chest.

A number of recessed areas are formed in the front surface 30 of the simulator 20 representing certain internal features of the human body where the cross-sectional view is taken. In particular, near the top end 22 of the simulator 20 a nasal cavity 42 is formed in the front surface 30. The nasal cavity 42 comprises a recessed area in the front surface 30 of the simulator 20. Preferably, the nasal cavity 42 is a recess about 0.2–0.4 inches in depth. A nare 44, preferably defined by a recessed area of the front surface 30, extends from the first side 26 to the nasal cavity 42. The nare 44 is appropriately oriented at that portion 36 of the first side 26 of the simulator 20.

An oral cavity 46 is also provided. The oral cavity 46 comprises a recessed area of the front surface 30 of the simulator 20 below the nasal cavity 42. An esophagus 48 is also provided. The esophagus 48 comprises an elongate recessed area in said front surface 30. A pharynx 47 is defined by the intersection of the recessed areas defining the esophagus 48 and the oral cavity 46. The esophagus 48 extends from the pharynx 47 downwardly to the bottom end 24 of the simulator 20.

The simulator 20 also includes a trachea 50. The trachea 50 comprises a recessed area in said front surface 30. This recessed area extends from the esophagus 48 towards the first side 26, and then downwardly to the bottom end 24 of the simulator 20.

In the preferred embodiment, the simulated cross-section is generally one in which the nasal cavity 42, esophagus 48 and trachea 50 are bisected. The simulator 20 thus includes a structure representative of at least about one-half of each of these features. The recess forming each of the esophagus 48 and trachea 50 is thus preferably generally semi-circular in shape, with the depth of the recess being approximately one-half the diameter of the average esophagus and trachea of a human, respectively.

Between the recesses defining the trachea 50 and esophagus 48 is a structure representing the tracheoesophageal wall 52. This wall 52 extends between the recesses defining the trachea 50 and esophagus 48 from their intersection to the bottom end 24 of the simulator 20. Preferably, the recesses forming the trachea 50 and esophagus 48 are positioned in the front surface 30 close enough to one another that the wall 52 formed therebetween is relatively thin, simulating the actual tracheoesophageal wall of the human body.

Regardless of what material the remainder of the simulator 20 is constructed from, the wall 52 is constructed from a material such that the wall is flexible or resilient. In particular, the wall 52 is constructed to have sufficient flexibility that when the cuff of a tracheostomy tube is inflated within the recess defining the trachea 50, the wall 52 will move or flex outwardly into the recess defining the esophagus 48 (thereby narrowing the recess which defines the esophagus). In the instance where the simulator 20 is constructed of polyethylene, the wall 52 is preferably about 0.25–0.5 inches thick, depending on the location.

Preferably, the simulator 20 includes a segment of the material extending across the recessed area forming the trachea 50 at the trachea/esophagus intersection. This segment of material represents voice or vocal cords 53.

The simulator 20 includes a simulated stoma 54. The stoma 54 preferably comprises a recessed area in the front surface 30 extending from the portion 40 of the first side 26 representing the neck to the recessed area defining the trachea 50.

It will be understood to those skilled in the art that the particular orientation, shape and size of the body features may vary depending on the human body to be represented by the simulator 20. The particular sizes of the simulated features may, for example, be varied depending on whether the structure of a child or an adult is being simulated. Similarly, the size and position of the stoma 54 may vary in order to represent variations thereof.

In order to aid the user of the simulator 20 in identifying certain of the features represented by the simulator corresponding to a body, the front surface 30 may include identifying markings. Preferably, the markings comprise different colored areas. For example, those portions of the front surface 30 representing tissue which is positioned in the plane of the human body through which the cross-section is taken are of one color, such as flesh-colored. Those portions of the front surface 30 which are intended to represent bone, such as the vertebrae comprising the spine, are of another color, such as white. Preferably, the recessed areas of the front surface 30, such as those areas representing the trachea 50, nasal cavity 42 and esophagus 48, are of yet another color, such as red. The coloring may be created by dying the material from which the simulator 20 is constructed.

In accordance with the preferred embodiment of the present invention, means are provided for securing a tracheostomy tube to the simulator 20. Preferably, this means comprises a flexible loop 56 extending from the front surface 30 of the simulator 20. The loop 56 preferably spans the recessed area which defines the stoma 54. The loop 56 is positioned near the perimeter 34 of the first surface 30. The loop 56 is generally arched-shaped, extending outwardly from the front surface 30. The loop 56 cooperates with the recess defining the stoma 54 to generally create a circular loop or ring through which a tracheostomy tube (not shown) may be inserted. As described in more detail below, the loop 56 prevents the tracheostomy tube from falling out of the stoma 54 and trachea 50 in the direction of the front surface 30.

Similarly, means are preferably provided for securing a nasogastric tube to the simulator 20. Preferably, this means also comprises a loop 58 extending outwardly from the front surface 30. The loop 58 spans the recess defining the nare 44 and is positioned near the perimeter 34 of the front surface 30. The loop 58 cooperates with the recess forming the nare 44 to create a generally circular loop or ring through which a nasogastric tube may be inserted. As described in more detail below, the loop 58 prevents the nasogastric tube from falling out of the nare 44 and nasal cavity 42 in the direction of the front surface 30.

Use of the simulator 20 as a training aid is as follows. First, the simulator 20 of the present invention is useful in teaching proper placement of a nasogastric tube. The user inserts the end of the tube through the ring formed by the loop 58 and the recess defining the nare 44. Once inserted, the user feeds the tube through the nasal cavity 42 and downwardly through the pharynx 47 and along the esophagus 48.

The simulator 20 of the present invention is also useful in teaching placement of a tracheostomy tube. The user inserts the first end of the tube through the ring formed by the loop 56 and recess defining the stoma 54. The user extends the tube through the stoma 54 and into the trachea 50. The user may pass the strap or other tracheostomy tube securing means around the "neck" of the simulator. The loops 56, 58 are also shown in FIG. 2.

The simulator 20 is also useful in teaching proper tracheostomy tube cuff inflation. In particular, once the tracheostomy tube is properly placed, the user may inflate the cuff positioned on the first end thereof. Advantageously, a user may visually determine whether he or she has properly inflated the cuff, or if he or she has under or overinflated the cuff. In particular, if the cuff is overinflated, the cuff will force the flexible tracheoesophageal wall 52 outwardly (i.e. in the direction from the first side 26 to the second side 28), thereby narrowing the esophagus 48 formed in the front surface 30 of the simulator 20. If the user overinflates the cuff, once the cuff is at least partially deflated, the tracheoesophageal wall 52 resumes its original position.

The simulator 20 of the present invention is also useful in teaching or demonstrating tracheostomy care, tracheostomy and nasotracheal suctioning, tracheostomy tube change procedure, and the location of anatomical structures in relation to a placed tracheostomy or nasogastric tube.

Variations of the simulator 20 of the present invention are contemplated without varying from the scope thereof. For example, the simulated cross-section may be taken slightly off of a central axis extending through the trachea and esophagus of a human. In this arrangement, the recesses defining the trachea and esophagus 50,48, respectively, may more generally comprise tubular passages through the simulator. At a minimum, however, either a portion of the tubular passage intersects the front surface of the simulator so as to be open thereto (so as to permit viewing of the placement the tubes and/or proper cuff inflation).

As yet another variation of the present invention, it is possible to cover the front surface 30 of the simulator 20 or have the simulated structures positioned within the interior thereof. It is desired, however, that the structures be visible to the user. For example, the material comprising the simulator may, at least in one or more areas, comprise a clear or substantially clear material through which the user may view the progress of his tracheostomy or nasogastric tube placement and/or the effects of the cuff inflation.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A device for use in training proper tracheostomy tube placement and tracheostomy tube cuff inflation comprising: a simulator having a first surface simulating a surface of the human body at a cross-sectional plane taken therethrough, a second surface simulating an exterior surface of the human body, a first recessed area in said first surface defining a simulated trachea, a second recessed area in said first surface defining a simulated esophagus and a simulated tracheoesophageal wall, said wall comprising a flexible divider positioned between said first and second recessed areas, said wall adapted for movement in the direction of said simulated esophagus when subjected to the inflation pressure of a tracheostomy tube cuff positioned in said simulated trachea.

2. The device in accordance with claim 1, further including a third recessed area in said first surface, said third recessed area defining a simulated stoma and extending from said second surface to said first recessed area in said first surface.

3. The device in accordance with claim 1, further including means for securing a tube in said third recessed area.

4. The device in accordance with claim 3, wherein said means comprises an arch-shaped element spanning said third recessed area.

5. The device in accordance with claim 1, further including a third recessed area in said first surface defining at least a portion of a simulated nasal cavity, and a fourth recessed area extending from said third recessed area to said second surface defining a simulated nare.

6. The device in accordance with claim 5, further including means for securing a tube in said fourth recessed area.

7. The device in accordance with claim 6, wherein said means comprises an arch-shaped element spanning said fourth recessed area.

8. The device in accordance with claim 1, wherein said wall is constructed of polyethylene.

9. An observation model for use in training tracheostomy and nasogastric tube placement and proper tracheostomy cuff inflation, said model comprising a simulator having a simulated trachea, a simulated esophagus and a simulated tracheoesophageal wall, said wall comprising a flexible member dividing said simulated trachea and esophagus, said wall adapted for movement in the direction of said simulated esophagus when subjected to the inflation pressure of a tracheostomy tube cuff positioned in said simulated trachea.

10. An observational model in accordance with claim 9, further including a simulated stoma.

11. An observational model in accordance with claim 9, further including a simulated nasal cavity extending in communication with said esophagus, and a simulated nare extending in communication with said nasal cavity.

12. An observational model in accordance with claim 9, wherein said model includes a surface simulating a cross-sectional surface of the human body.

13. An observation model in accordance with claim 12, wherein said simulated esophagus and simulated trachea comprise recessed areas in said surface.

14. A method for training proper tracheostomy tube placement and tracheostomy tube cuff inflation with an anatomical simulator having a simulated trachea, simulated esophagus and simulated tracheoesophageal wall therebetween, said wall comprising a flexible member, comprising the steps of:

placing a first end of a tracheostomy tube into said simulated trachea of said observational model inflating a cuff positioned on said first end of said tracheostorny tube; and pressing said wall outwardly in the direction of said simulated esophagus in response to cuff over-inflation.

15. The method in accordance with claim 14, wherein said anatomical simulator includes a simulated stoma and said placing step comprises extending said first end of said tracheostomy tube through said stoma into said trachea.

16. The method in accordance with claim 14, wherein said anatomical simulator includes a simulated nasal cavity in communication with said simulated esophagus and said method further comprises the step of inserting a nasogastric tube through said simulated nasal cavity and esophagus.

\* \* \* \* \*